Dec. 3, 1929.  H. L. BRUMP ET AL  1,737,825
CLUTCH FOR REFRIGERATORS
Filed Sept. 30, 1927

INVENTOR.
H. L. Brump
BY F. Bauch
Maréchal and Noé
ATTORNEYS.

Patented Dec. 3, 1929

1,737,825

UNITED STATES PATENT OFFICE

HERBERT L. BRUMP AND FREDRICK BAUCH, OF DAYTON, OHIO, ASSIGNORS TO THE DAY-FAN ELECTRIC COMPANY, OF DAYTON, OHIO, A CORPORATION OF OHIO

CLUTCH FOR REFRIGERATORS

Application filed September 30, 1927. Serial No. 223,095.

This invention relates to clutches and more particularly to clutches which are operated automatically by centrifugal force at the proper speed of rotation so as to connect an electric motor or similar driving member to a driven member or load.

One object of the invention is the provision of a clutch of this character having a novel construction capable of being cheaply manufactured and easily assembled, in which a centrifugal weight member is prevented from moving outwardly to cause the engagement of the clutch until a predetermined speed of rotation is attained, and then acts to move outwardly in a sudden and instantaneous manner for its full extent of outward movement to cause the tight engagement of the clutch and effect the driving of the driven means.

Other objects and advantages of the invention will be apparent from the following description and the accompanying drawings.

Figure 1:
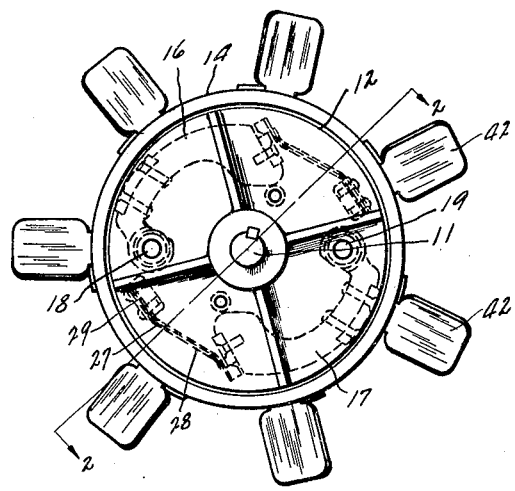
Fig. 1 is a view in end elevation showing a clutch embodying the present invention.

Referring to the drawings by reference numerals, an electric motor or other suitable driving device 10 is connected through the motor shaft 11 to a driving member 12, which is preferably in the form of a disc, this member being fixed to the shaft 11 by a suitable set-screw 13 or by any other suitable attachment means. The driven member of the clutch, as shown, is substantially drum-shaped and comprises a cylindrical portion 14 which is rigid with the pulley 15. This pulley is adapted to receive a driving belt which may drive a load such as the compressor of a refrigerator.

Figures 2, 3:
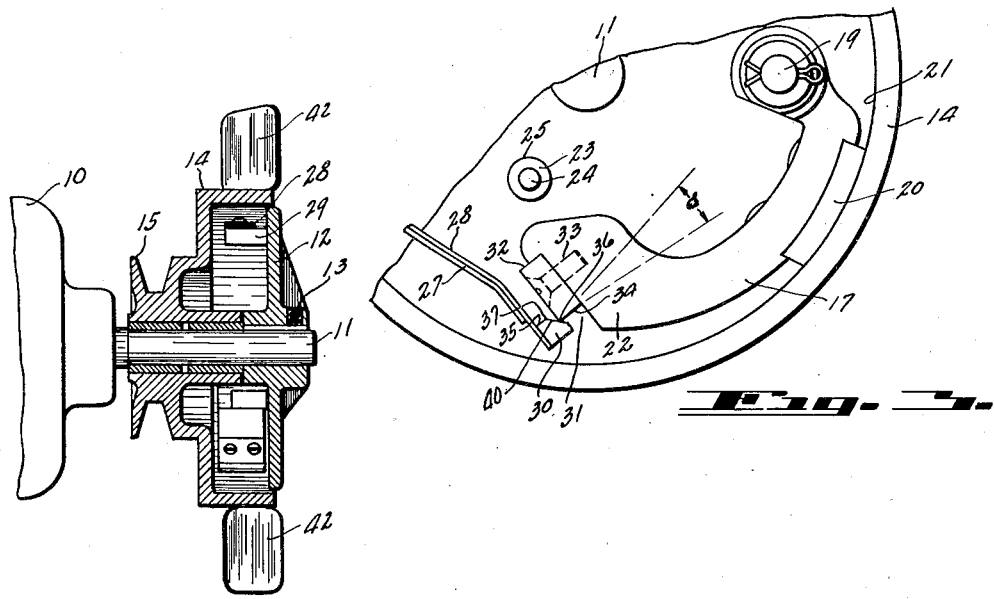
Fig. 2 is a section on the line 2—2 of Fig. 1.
Fig. 3 is an enlarged detail view showing the engagement between the centrifugal weight member and the spring latch in the running position.

Mounted on the disc-shaped driving member 12, so as to move outwardly under the action of centrifugal force, are a plurality of weight members symmetrically arranged about the center of the disc. Two weight members 16 and 17 are shown in the drawings, each being pivoted at one end thereof to the pins 18 and 19 which are preferably integrally provided on the inner side of the disc 12. The weight members 16 and 17 are of identical form and construction. As shown in Fig. 3 the weight member 17 is provided with a friction clutch surface 20 which may be a pad of friction material riveted or otherwise made fast to the weight member, and formed to fit the inner cylindrical surface 21 of the driven member of the clutch when the weight is in its outer extreme position. The end 22 of the weight member remote from the pivotal axis is comparatively heavy so that centrifugal force acting upon the weight member when the driving member 12 is rapidly rotating will cause the friction pad 20 to be firmly pressed against the inner cylindrical clutch surface 21 of the driven member. When the driving member 12 of the clutch is at rest or is rotating at a slow speed the end 22 of the weight member rests against a stop 23. This stop is preferably formed of a pin 24 projecting integrally from the disc 12, a leather or fiber bushing 25 surrounding the pin to provide a non-metallic stop for the weight member 17.

The weight member 17 is prevented from moving outwardly any substantial amount to prevent the friction pad 20 from engaging with the driven member of the clutch until a predetermined speed of rotation is attained, and then after the predetermined speed of rotation has been reached the weight member is suddenly permitted to move outwardly in an instantaneous manner to effect the tight engagement of the friction pad 20 with the driven clutch member, the centrifugal force acting upon the comparatively heavy end of the weight member 17 at this time exerting considerable pressure on the friction pad so that relative slipping of the driving and driven members of the clutch is prevented. The control of the weight member just described is accomplished by means of a spring-pressed latch member designated generally 27, it being understood that a similar latch member is preferably provided for each of the weight members. As shown in Figs.

1 and 3 the latch member 27 comprises a leaf spring 28 which is preferably in the form of a cantilever spring fixed at one end to a block 29 which may be integrally provided on the inner side of the disc 12. The other end of the spring 28 provides a latch member 30, which is preferably in the form of a metal block riveted or otherwise firmly attached to the end of the spring 28. When the weight member 17 is in its inner position resting against the leather or fiber bushing 25 the block 30 is received in a notch 31 of the weight member. This notch is provided, as shown, by a metal block 32 which is fixed in place by means of a screw 33 to the end of the weight member remote from its pivotal support. The block 32 has a surface 34 which lies in a plane preferably at a slight angle "a" to the plane including the axis of rotation of the weight member and the end of the surface 34. In practice it has been found that an angle of about 10° is satisfactory, although considerable variation of this angle is permitted by properly proportioning the strength of the spring and the other parts of the clutch. The surface 34 when the weight member 17 is in its innermost position is engaged by a corresponding surface 35 on the latch block 30, and due to the arrangement of the spring 28 the cam block 30 retains the end of the weight member 17 in its inner normal position until a large centrifugal force is exerted on the weight member tending to move it outwardly. When this occurs the cam block 30 moves outwardly a small distance until the outer edge 36 of surface 34 passes the inner edge 37 of the surface 35. Only a very small motion of the weight member 17 takes place during the time the spring latch is being forced outwardly sufficiently to permit the edges 36 and 37 of the engaging surfaces to pass, and during this time the friction pad 20 is maintained entirely free from engagement with the driven clutch surface. The strength of the spring 28 and the angularity of the surfaces 34 and 35 and the extent of these surfaces are so designed that at the proper predetermined speed of rotation the edges 36 and 37 of the engaging surfaces will pass and at this time, since the strong restraining effect of the cam latch is very materially and instantaneously reduced the weight member 17 will move outwardly in a sudden and instantaneous manner to permit the full engagement of the friction pad 20 with the driven surface of the clutch, the centrifugal force acting on the weight member causing sufficient pressure on the weight member so that slipping of the clutch will be prevented. The inertia of the rapidly moving parts of the driving member and of the device by which it is driven is thus imparted comparatively instantaneously to the driven clutch member, and the momentum thus imparted to the driven clutch member causes starting of the load with comparatively small additional drain on the current taken by the motor.

The cam block 30 is provided with a cam surface 40 which is at a considerable angle to the surface 35 of the block and which intersects the surface 35 at the edge 37. The inclined surface 40 is sufficiently long so that the edge 36 of the block 32 of the weight member will be retained in engagement therewith when the weight member is at its extreme outer limit of movement and the clutch is engaged. The retracting effort of the spring-pressed cam block 30 acting through the surface 40 at a considerable angle to the radial direction produces a comparatively small retracting effort on the end of the weight member 17. The component of the force exerted against the edge 36 when engaged by the inclined surface 40 of the cam block, which produces a turning torque about the axis of the weight member is sufficiently small so that it is greatly exceeded by the centrifugal force acting on the weight block at the normal operating speed of the motor, and sufficient pressure is thus provided by the action of centrifugal force to cause the sudden and full tight engagement of the clutch members after the edges 36 and 37 of the two blocks 32 and 30 pass each other. The retracting effort exerted by the cam block acting along the surface 40 against the edge 36 of the weight member is sufficient however when the weight member is at its outermost position to return the weight members to their original position abutting against the stops 23, when the speed of rotation of the driving member and of the clutch has fallen to some low value below the normal operating speed, at which time the centrifugal force acting on the weight member will not be sufficient to overcome the retracting effort exerted by the cam block 30. It will be understood that the speed of rotation at which the disengagement of the clutch members takes place is very materially below the speed of rotation at which the engagement of the clutch members takes place, and thus if an overload is applied to the motor or if the motor voltage falls or the speed of rotation of the motor is otherwise somewhat decreased, the clutch will not be permitted to slip and the weight members will be held outwardly to maintain a tight engagement of the clutch surfaces.

The driven member of the clutch is provided, as shown, with a series of air vanes or fans 42 which are attached directly to the outer surface of the drum-shaped member 14 and which are designed to direct air in the direction of the axis of the motor either for cooling the motor or for directing a blast of air towards the refrigerating coils of the refrigerator where the clutch is used to connect an electric motor to a refrigerating compressor.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A clutch comprising a rotatable driving member, a weight member pivotally mounted on said driving member so as to move outwardly from the axis of the rotatable driving member under the action of centrifugal force, said weight member having a friction clutch surface, a rotatable driven member having a friction clutch surface adapted to be engaged by the surface on said weight member, and means for preventing any substantial outward movement of the weight member until a predetermined speed of rotation is attained and then when the predetermined speed of rotation is attained suddenly acting to permit the instantaneous full outward movement of the weight member and the tight engagement of said clutch surfaces, said means comprising a spring-pressed latch member having a flat stop surface definitely stopping outward movement of the weight member and a flat returning surface inclined to the stop surface and adapted to exert a comparatively slight retaining force on the weight member in its outer position.

2. A clutch comprising a rotatable driving member, a weight member mounted on said driving member so as to move outwardly under the action of centrifugal force, said weight member having a friction clutch surface, a rotatable driven member having a friction clutch surface adapted to be engaged by the surface on said weight member; and means for preventing any substantial outward movement of the weight member until a predetermined speed of rotation is attained and then suddenly acting to permit the instantaneous full outward movement of the weight member and the tight engagement of said clutch surfaces comprising a cam member engaging the weight member, and a spring fixed at one end to the rotatable driving member and bearing said cam member at its other end.

3. A clutch comprising a rotatable driving member, a weight member mounted on said driving member so as to move outwardly under the action of centrifugal force, said weight member having a friction clutch surface, a rotatable driven member having a friction clutch surface adapted to be engaged by the surface on said weight member, and means for preventing any substantial outward movement of the weight member until a predetermined speed of rotation is attained and then suddenly acting to permit instantaneous full outward movement of the weight member and the tight engagement of said clutch surfaces, comprising a cam block normally engaging said weight member, a cantilever leaf spring fixed at one end to the rotatable driving member and bearing said cam block at its other end, the retaining effect of the cam block on the weight member being instantaneously materially decreased at a definite speed of rotation to permit the full outward movement of the weight member while the cam block remains in engagement with the weight member to exert a comparatively small retracting effort on the weight member.

4. A clutch comprising a rotatable driving disc, a weight member pivotally mounted on said disc so as to move outwardly under the action of centrifugal force, said weight member having a friction clutch surface, a drum-shaped driven member having an inner cylindrical surface adapted to be clutched by said friction clutch surface, and means for preventing any substantial outward movement of the weight member until a predetermined speed of rotation is attained and then suddenly acting to permit the instantaneous full outward movement of the weight member and the tight engagement of said clutch surfaces comprising a cantilever spring fixed at one end to the driving disc and having a latch surface at its free and engaging said weight member at a point remote from the pivot thereof.

5. A clutch comprising a rotatable driving disc, a weight member pivoted on a face of said driving disc so as to move outwardly under the action of centrifugal force, said weight member having a friction clutch surface, a drum-shaped driven member having an inner cylindrical surface adapted to be clutched by the friction clutch surface of the weight member, and means for preventing any substantial outward movement of the weight member until a predetermined speed of rotation is attained and then suddenly acting to permit the instantaneous full outward movement of the weight member and the tight engagement of said clutch surfaces comprising a cantilever leaf-spring fixed at one end to the rotatable driving disc and providing a cam block at its free end having a surface normally engaging the weight member to exert a large retaining force on the weight member and instantaneously releasable at a definite predetermined speed of rotation, and providing a second surface which is retained in engagement with the weight member when the weight member has moved outwardly, to exert a comparatively small retractive effort acting against the centrifugal force on the weight member, and means limiting the inward movements of the weight member.

In testimony whereof we hereto affix our signatures.

HERBERT L. BRUMP.
FREDRICK BAUCH.